US011361755B2

(12) United States Patent
Hirzel et al.

(10) Patent No.: US 11,361,755 B2
(45) Date of Patent: *Jun. 14, 2022

(54) PERSONALIZATION OF CONVERSATIONAL AGENTS THROUGH MACRO RECORDING

(71) Applicant: International Business Machines Corporation, Armonk, NY (US)

(72) Inventors: Martin Hirzel, Ossining, NY (US); Louis Mandel, New York, NY (US); Avraham E. Shinnar, Hawthorne, NY (US); Jerome Simeon, New York, NY (US); Mandana Vaziri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/703,223

(22) Filed: Dec. 4, 2019

(65) Prior Publication Data
US 2020/0105248 A1 Apr. 2, 2020

Related U.S. Application Data

(63) Continuation of application No. 15/849,849, filed on Dec. 21, 2017, now Pat. No. 10,553,204.

(51) Int. Cl.
| | |
|---|---|
| *G10L 15/00* | (2013.01) |
| *G10L 15/07* | (2013.01) |
| *G10L 15/187* | (2013.01) |
| *G10L 15/18* | (2013.01) |
| *H04L 51/02* | (2022.01) |
| *G06F 40/35* | (2020.01) |

(Continued)

(52) U.S. Cl.
CPC ............ *G10L 15/075* (2013.01); *G06F 40/35* (2020.01); *G10L 15/187* (2013.01); *G10L 15/1815* (2013.01); *H04L 51/02* (2013.01); *G06F 40/247* (2020.01); *G06F 40/58* (2020.01); *G10L 15/22* (2013.01); *G10L 2015/223* (2013.01)

(58) Field of Classification Search
CPC .......... G10L 15/18; G10L 15/22; G06F 3/167
See application file for complete search history.

(56) References Cited

U.S. PATENT DOCUMENTS

| | | | |
|---|---|---|---|
| 6,336,149 B1 | 1/2002 | Preston | |
| 6,728,679 B1 | 4/2004 | Strubbe et al. | |

(Continued)

OTHER PUBLICATIONS

Anonymous, "Tapping otherwise unused data," IP.com, IPCOM000234686D, Jan. 28, 2014, 3 pages.

(Continued)

*Primary Examiner* — Daniel Abebe
(74) *Attorney, Agent, or Firm* — Scully, Scott, Murphy & Presser, P.C.; Anthony R. Curro

(57) ABSTRACT

A computer-implemented conversational agent engages in a natural language conversation with a user, interpreting the natural language conversation by parsing and tokenizing utterances in the natural language conversation. Based on interpreting, a set of utterances in the natural language conversation to be recorded as a macro is determined. The macro is stored in a database with an associated macro identifier. Replaying of the macro executes a function specified in the set of utterances.

20 Claims, 6 Drawing Sheets

(51) Int. Cl.
*G10L 15/22* (2006.01)
*G06F 40/58* (2020.01)
*G06F 40/247* (2020.01)

(56) References Cited

U.S. PATENT DOCUMENTS

| | | | |
|---|---|---|---|
| 6,816,837 B1 | 11/2004 | Davis | |
| 7,421,654 B2 | 9/2008 | Wugoski | |
| 8,818,926 B2 | 8/2014 | Wallace | |
| 10,089,070 B1* | 10/2018 | Kanjariya | G06F 3/167 |
| 2004/0054538 A1 | 3/2004 | Kotsinadelis | |
| 2008/0288259 A1* | 11/2008 | Chambers | G10L 15/22 |
| | | | 704/275 |
| 2009/0187407 A1 | 7/2009 | Soble et al. | |
| 2010/0312547 A1* | 12/2010 | Van Os | G06F 3/167 |
| | | | 704/9 |
| 2015/0256873 A1* | 9/2015 | Klein | H04N 21/4383 |
| | | | 725/39 |

OTHER PUBLICATIONS

Anonymous, "Enrichment of Knowledge Base of Conversational Agents by Active Question Targeting," IP.com, IPCOM000250619D, Aug. 10, 2017, 5 pages.
Elvir, M., et al., "Remembering a Conversation—A Conversational Memory Architecture for Embodied Conversational Agents," Journal of Intelligent Systems 2017, Received Sep. 1, 2015, previously published online Feb. 25, 2016, pp. 1-21, 26 (1).
List of IBM Patents or Patent Applications Treated as Related, dated Dec. 4, 2019, 2 pages.

\* cited by examiner

H: identify the text `La vie est belle`
C: You chose: identify GET text La vie est belle . Calling now. "fr"

---
H: translate the text `La vie est belle` from source `fr` to target `en`
C: You chose: translate GET text `La vie est belle` source `fr` target `en` . Calling now.
"Life is Beautiful"
H: name this action
C: What would you like to name this action?
H: myAction
C: Thanks, action myAction created
--- *RECORD / NAME DIALOG*

---
H: myAction
C: You chose: translate GET text `La vie est belle` source `fr` target `en` . Calling now.
"Life is Beautiful"
--- *RECALL DIALOG*

H: myAction with something else for text such as `Le chat dort`
C: You chose: translate GET text `Le chat dort` source `fr` target `en` . Calling now.
"The cat sleeps"
--- *PARAMETERIZE DIALOG*

H: I would like to add a synonym for an action.
C: On which action or resource would you like to add a synonym?
H: On the action translate.
C: You chose: translate. What synonym would you like to add?
H: convert
C: Ok, adding convert as a synonym for translate.
--- *ADD DIALOG SYNONYM*

FIG. 4

PERSONALIZATION OF CONVERSATIONAL AGENTS THROUGH MACRO RECORDING

FIELD

The present application relates generally to computers and computer applications, and more particularly to computer conversational agents or chatbots.

BACKGROUND

Chatbots, also known as conversational agents, are computer programs that can engage with a human in a natural-language conversation or dialog. In a business context, companies may want to offer chatbots to their customers and employees to answer questions, enable self-service, and/or perform other tasks. While this works well in reducing turn-around times for the users and costs for the providers, it can sometimes be cumbersome for the users. To reduce the risk for misunderstanding, chatbots tend to require the user to interact with fine-grained prompts. That experience is acceptable during a first conversation, while the user is learning how to use the bot. With this one-size-fits-all approach, as a user becomes familiar with the task, interactions become repetitive.

BRIEF SUMMARY

A computer-implemented conversational agent method and system may be provided. The method, in one aspect, may include executing a conversational agent to engage in a natural language conversation with a user, wherein a conversation takes place between the user and the at least one hardware processor executing the conversational agent. The method may also include interpreting the natural language conversation by the conversational agent by parsing and tokenizing utterances in the natural language conversation. The method may further include, based on the interpreting, determining that a set of utterances in the natural language conversation is to be recorded as a macro. The method may also include storing the macro in a database with an associated macro identifier. Replaying of the macro may execute a function specified in the set of utterances.

A conversational agent system, in one aspect, may include a hardware processor and a storage device coupled with the hardware processor. The hardware processor may be operable to receive natural language utterances from a user and output responses to the user in natural language. The hardware processor may be further operable to invoke a web application programming interface to call a web service in providing the responses to the user, wherein a conversation takes place between the user and the hardware processor in providing the web service to the user. The hardware processor may be operable to interpret the natural language utterances by parsing and tokenizing the natural language utterances. Based on interpreting, the hardware processor may be operable to determine that a set of utterances in the natural language conversation is to be recorded as a macro, and to store on the storage device the macro with an associated macro identifier. The hardware processor may be further operable to replay the macro in response to detecting an utterance that includes the macro identifier in subsequent natural language conversation. Replaying of the macro may execute a function specified in the set of utterances.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 shows an example conversational agent interaction in one embodiment with the macro system in one embodiment.

DETAILED DESCRIPTION

Figure 1:
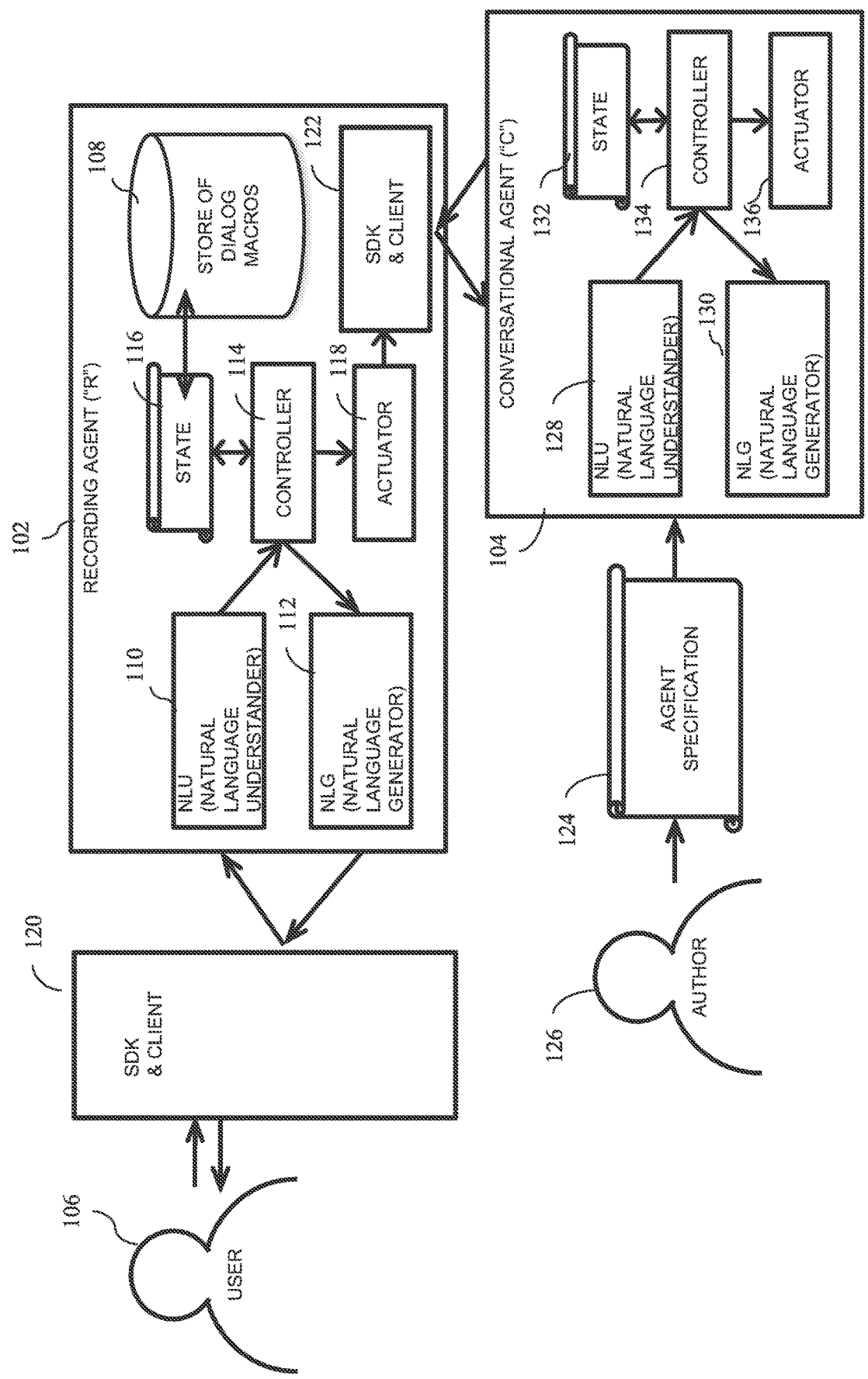
FIG. 1 illustrates the architecture of system components in one embodiment where components of the system may run on one or more hardware processors.

A system, method and techniques are presented that allow for personalizing a chatbot based on user proficiency level, common usage, and preferences. The system and method in some embodiment may accomplish such personalization by extending a conversational system for macro recording. For instance, the system and method extend a conversational system for macro recording, allowing users to record, replay and parameterize their interaction with a chat bot. A macro is a script or light-weight program: it contains recorded utterances from the user to the chatbot that can be recalled and replayed later without requiring the user to input or type them out again. In some embodiments, the macro may also be parameterized, to allow it to be replayed with variation. Parameterization makes macros more powerful, as they enable a single macro to capture a potentially infinite set of possible interactions.

Consider for example the following transcript of a conversation:
H: translate "Good morning" from English to German
C: "Guten Morgen"

In this conversation and in other examples that follow, lines prefixed with "H" are utterances by the human user, and lines prefixed with "C" are utterances by the chatbot (a machine or computer). In this example, for illustration purposes, the chatbot serves as a front-end for a language translation service. However, it should be understood that the techniques in the present disclosure apply to other chatbots as well, for example, chatbots that may serve as front-ends or conversational interfaces to other services.

After some time has passed, consider a second conversation between the same user and chatbot:
H: translate "Good night" from English to German
C: "Gute Nacht"

While it may have been acceptable to explicitly name the source and target language in the first conversation, it is repetitive in the second conversation. If the user wants to make many more similar interactions, the conversation with the machine (or computer) may slow them down so much as to become increasingly cumbersome. The system and method of the present disclosure in some embodiments, allows the user to record a macro.

The following conversation example illustrates a macro recording:
H: Record
C: Recording conversation
H: translate "Good morning" from English to German
C: "Guten Morgen"
H: End recording
C: Recording ended, how would you like to call this recording?
H: Germanize
C: Ok, should it be parameterized?
H: Yes, parameterize the input text "Good morning"
C: Ok, your recording has one parameter which is the input text.

In the above example conversation, the system and/or method creates a macro for future use, and the chatbot guides the user through the steps required to record and index that macro. With the macro created, the system and/or method allows the user to use the desired functionality more easily.

The following example conversation illustrates the use of the macro that is created:
H: Germanize "Good night"
C: "Gute Nacht"

Macro recording records a sequence of dialog steps and gives it a name, by which it can later be recalled and run. The sequence of recorded user dialog steps constitutes a lightweight program. Running the macro means playing the steps back to the base chatbot to repeat the previously accomplished effect. The system and/or method in some embodiments also allow for renaming of one or more macros, parameterizing one or more macros so that they can be replayed with variation, and specializing an existing sequence of dialog steps.

FIG. 1 illustrates the architecture of system components in one embodiment. Components of the system may run on one or more hardware processors. A recording agent ("R") 102 in one embodiment may be implemented as an intermediary to a conversational agent ("C") 104. For example, in one embodiment, the user 106 interacts with the conversational agent "C" 104, which corresponds with the recording agent "R" 102 as an intermediary. The recording agent "R" 102 decides whether the user utterance is a normal interaction with the conversational agent "C" 104 or a directive related to macro-recording.

If the utterance is a normal interaction the recording agent "R" 102 passes the utterance to the conversational agent "C" 104 unchanged. If the utterance is a directive related to macro-recording, the recording agent "R" 102 interprets that interaction accordingly.

The recording agent "R" 102 includes a store of dialog macros 108 which is used to maintain the known macros. That store 108 may be modified to retrieve an existing macro, to create a new macro, or to remove a macro.

The recording agent "R" 102 may be in one of two states: either not-recording, or recording. If the recording agent "R" 102 is in a not-recording state, it either passes utterances through to the conversational agent "C" 104, or awaits directive to retrieve and/or replay already stored macros, to delete already stored macros, or to start recording. If the directive is to start recording, the recording agent "R" 102 changes state from not-recording to recording and creates a new empty macro currently being recorded. If the recording agent "R" 102 is in a recording state, it waits for further utterances from the user and for each of them, performs the two following tasks: (i) it appends that utterance to the dialog macro currently being recorded, (ii) it passes that utterance to the conversational agent "C" 104.

If the user utterance is identified as an existing macro, the recording agent "R" 102 retrieves that macro from the store of dialog macros 108. That macro is then replayed by the recording agent "R" 102, which interacts with the conversational agent "C" 104 on behalf of the user. Once the macro has been completely replayed, the final response from the conversational agent "C" 104 is returned by to the user.

The recording agent 102 and the conversational agent 104 each may include and execute functionalities or components of a conversation service. A conversation service (e.g., 102, 104) is a platform for running a chatbot. In one embodiment, a conversation service (e.g., 102, 104) contains modules for natural language understander (NLU) 110, natural language generator (NLG) 112, and a controller 114, which controls the dialog and tracks its state 116. In one embodiment, the system of the present disclosure may include two instances of the conversation service. One service instance hosts the base chatbot without macro recording, for example, the conversational agent 104. The other service instance hosts the additional chatbot features that implement the macro recording support, for example, the recording agent 102. In some embodiments, the conversation service may be built on International Business Machines Corporation (IBM™)'s Watson Conversation Service (WCS) offering. The system may be implemented on or work with other conversation services.

A controller 114 may be driven by a finite state machine (FSM) maintaining states 116 of the conversation and may activate the actuator 118 for invoking the conversational agent at 104 via the web sdk and client component 122, for example, based on the state of the finite state machine's state 116. Based on the finite state machine's state 116, the controller 114 also instructs the database store 108 to record and store a macro comprising instructions from a portion of the conversation. The controller 114 receives inputs from the user 106 via an NLU (natural language understander) component 110, and sends outputs to the user 106 via an NLG (natural language generator) component 112. The NLU component 110 turns natural-language utterances from the user 106 into symbols for the controller 114. Symbols may include entities and intents, for example, as implemented in most chatbot platforms. For instance, an entity represents a term or object in a user utterance. An intent represents a purpose or goal, something a user wants to do. An intent classifier, e.g., built or implemented with supervised machine learning may recognize or classify the intent in the user utterance, in processing conversation. The controller 114 may maintain states according to the FSM 116 and turn symbols from the NLU 110 into instructions to the NLG 112 and the actuator 118. The NLG 112 turns instructions from the controller 114 into natural-language responses to the user 106. For instance, based on the NLU component 110's parsing and interpretation of the user utterance, the controller 114 may pass the utterance to the conversational agent 104 to handle, and may also instruct the database 108 to store a macro. The controller 114 may also instruct the NLG 112 to turn symbols or instructions into natural-language output to the user 106. In non-recording state, for example, the recording agent 104 passes the utterance to the conversational agent 104 as-is. In recording state, the recording agent 104 also passes the utterance to the conversational agent 104 as-is, and also records the conversation as a macro, which it stores into the database 108, for example, when recording is complete. In recording state, also, the controller 114 may send instructions to the NGL 112 to respond in natural language to the user 106, for instance, to indicate that recording is in progress, or to ask for a name for the macro, or to perform other interactive macro-related features.

Similarly, the conversational agent 104 may include the conversation services components such as the NLU 128 that parses and tokenizes user utterance from the user 106 received from the recording agent 102, for example, via the SDK and client component 122. The controller 134 receives symbols from the NLU 128, and sends instructions to the NLG 130 to output natural language responses to the user 106, and the actuator 136 to invoke one or more services (e.g., API calls) for providing to the user 106. The NLG 130 output may be passed back to the recording agent 102 to utter back to the user 106, either directly in textual form on a graphical display, and/or alternatively by a voice synthesizer or like device.

The conversational agent 104 may receive an agent specification 124, for example, created or authored by a user 126. The conversational agent 104 may parse the agent specification 124 and use it as guidance for talking to the user 106 (e.g., in natural language). The conversational agent 104 may invoke or call via the actuator a web API (e.g., in Hypertext Transfer Protocol (HTTP)) or the like for invoking a service if needed to provide the functionality of that service according to the conversation with the user 106.

A conversation service 102 is coupled with a software development kit (SDK) 120 that serves as a client library. The SDK and client 120 offers client-side application programming interfaces (APIs) wrapping the actual conversation service instance in the cloud. Similarly, the conversation service 104 is coupled with SDK and client 122. In some embodiment, the system may also take advantage of dispatcher extensions to the client 122. Dispatcher extensions, however, are not necessary.

The database for dialog macros 108 may include a full-fledged database system in some embodiment. In other embodiments, the database for dialog macros 108 may be implemented as a simple store. Macros may be stored and persist in the database over time.

While FIG. 1 shows two instances of conversation service implementing a recording agent and a conversational agent, both functionalities of the recording agent and the conversational agent may be implemented on a single conversation service, which combines those functionalities.

Figure 2:
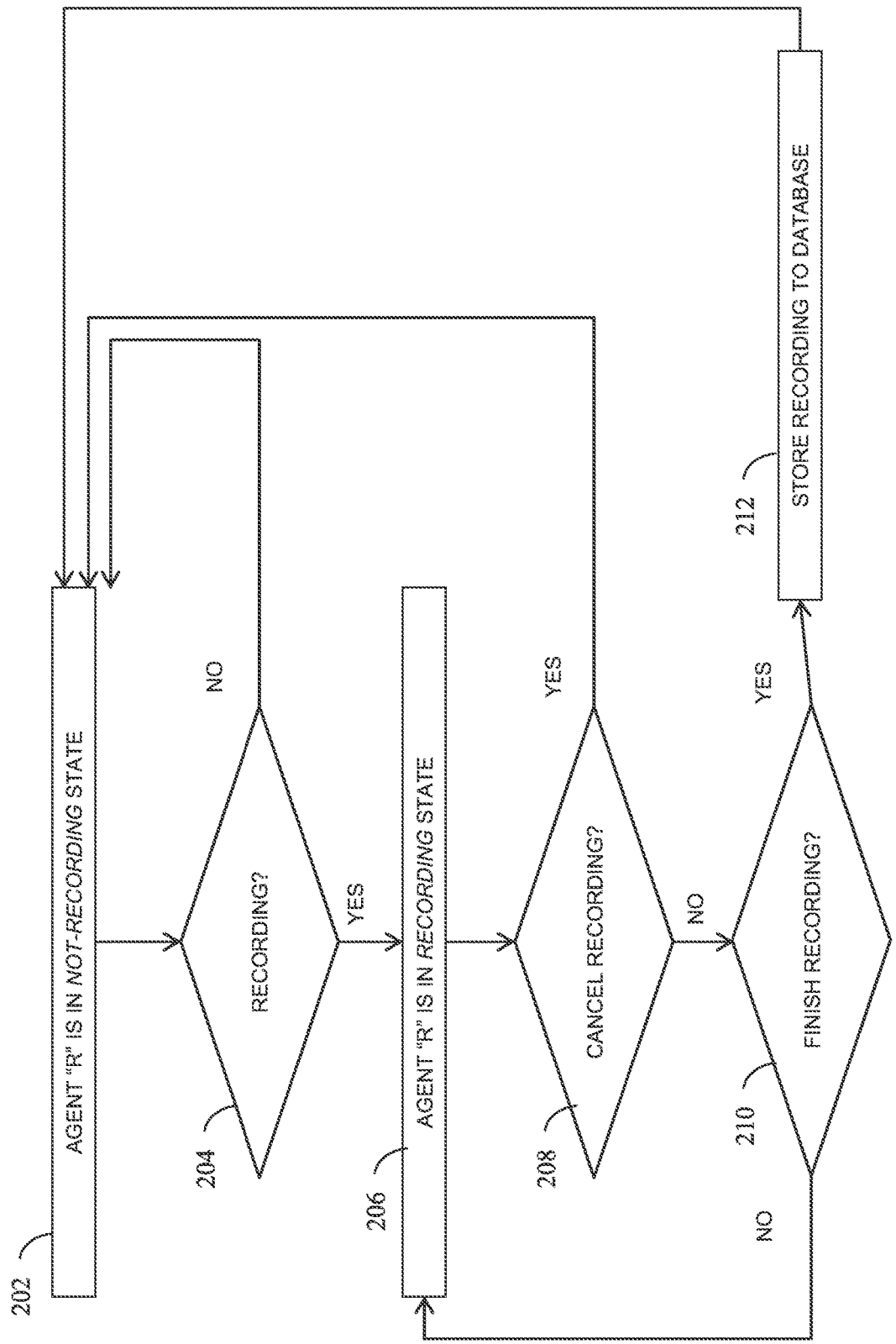
FIG. 2 is a diagram illustrating state transitions for a recording agent in one embodiment.

FIG. 2 is a diagram illustrating state transitions for a recording agent in one embodiment. At 202, agent "R" is in "not-recording" state. At 204, it is determined whether the recording agent is recording. For instance, based on processing an utterance received from a user, it may be determined whether the recording agent should begin recording. As described above, a natural language processing and speech interpretation techniques may be employed to determine the content of the utterance, and whether that content specifies that a macro should be recorded. At 204, if it is determined that no recording is requested, the state remains in "not-recording state" at 202.

At 206, if the recording agent is should be recording as determined at 204, the state of the recording agent transitions to "recording" state. At 208, it is determined whether a cancellation of the recording is requested. For instance, based on processing an utterance received from a user, it may be determined whether the recording should be canceled. As described above, a natural language processing and speech interpretation techniques may be employed to determine the content of the utterance, and whether that content specifies that the recording should be canceled. If at 208, it is determined that the recording should be canceled, the state of the recording agent transitions back to "not-recording" state. Otherwise, the logic continues to 210.

At 210, it is determined whether the recording is finished. For instance, based on processing an utterance received from a user, it may be determined whether the recording is completed. As described above, natural-language processing and speech interpretation techniques may be employed to determine the content of the utterance, and whether that content specifies that the recording ended. If at 210, it is determined that the recording is not finished, the state of the recording agent remains in "recording" state, and the user interactions continue to be recorded.

At 212, if the recording has completed as determined at 210, the recording is saved to a database.

Figure 3:
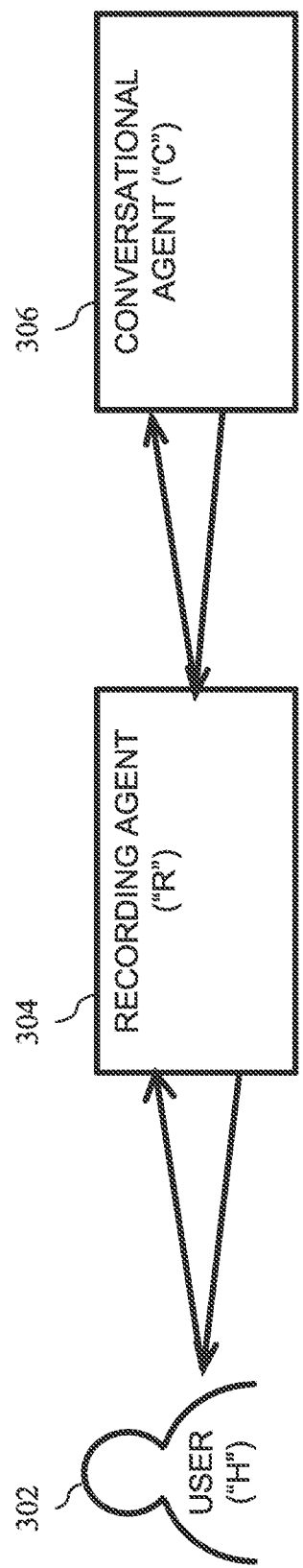
FIG. 3 is a diagram showing a conversational flow among a user, recording agent and conversational agent in one embodiment.

FIG. 3 is a diagram showing a conversational flow among a user, recording agent and conversational agent in one embodiment. An example dialog flow is shown in Table 1. The example illustrates how user utterances are processed, depending on the state of the recording agent "R". The user dialog 302 is shown in the second column of Table 1. The utterances that are processed by the recording agent "R" 304 are shown in the third column of Table 1. The utterances that are processed by the conversational agent "C" 306 are shown in the fourth column of Table 1.

TABLE 1

| Line # | User "H" | Recording agent ("R") | Conversational agent ("C") |
|---|---|---|---|
| 1. | H: Hello | . . . | H: Hello |
| 2. | C: Welcome to the translator | . . . | C: Welcome to the translator |
| 3. | H: Record | H: Record | . . . |
| 4. | C: Recording conversation | C: Recording conversation | . . . |
| 5. | H: translate "Good morning" from English to German | . . . | H: translate "Good morning" from English to German |
| 6. | C: "Guten Morgen" | . . . | C: "Guten Morgen" |
| 7. | H: End recording | H: End recording | . . . |
| 8. | C: Recording ended, how would you like to call this recording? | C: Recording ended, how would you like to call this recording? | . . . |
| 9. | H: Germanize | H: Germanize | . . . |
| 10. | C: Ok, should it be parameterized? | C: Ok, should it be parameterized? | . . . |

TABLE 1-continued

| Line # | User "H" | Recording agent ("R") | Conversational agent ("C") |
|---|---|---|---|
| 11. | H: Yes, parameterize the input text "Good morning" | H: Yes, parameterize the input text "Good morning" | . . . |
| 12. | C: Ok, your recording has one parameter which is the input text. | C: Ok, your recording has one parameter which is the input text. | . . . |
| 13. | H: Germanize "Good night" | H: Germanize "Good night" | H: translate "Good night" from English to German |
| 14. | C: "Gute Nacht" | . . . | C: "Gute Nacht" |

In some embodiments, at the beginning of a dialog, the recording agent "R" 304 is always in the not-recording state. The utterance on line 1 is determined to be normal interactions and passed by the recording agent "R" 304 to the conversational agent "C" 306 as-is. The response from the conversational agent "C" 306 is returned as-is to the user on line 2. The utterance on line 3 is determined to be a directive to the recording agent "R" 304 to change state from not-recording to recording. The recording agent "R" 304 responds to the user 302 on line 4 to indicate that it is starting recording.

The utterance on line 5 is determined to be a normal interaction and processed in two ways: (i) it is appended to the dialog macro currently being recorded by the recording agent "R" 304, (ii) it is sent to the conversational agent "C" 306 which provides an answer which is returned back to the user 302 on line 6.

The utterance on line 7 is determined to be a directive to the recording agent "R" 304 to change state from recording to not-recording. The recording agent "R" 304 responds to the user 302 on line 8 to indicate that recording has ended.

The recording agent "R" 304 proceeds (on lines 8 to 12) by asking the user 302 additional information about the macro: (i) how should that macro be named for future retrieval, (ii) should the macro be generalized and include parameters, and which ones. In the example shown in Table 1, the macro is called "Germanize" and has one parameter which is the input text to be translated to the German language.

The utterance on line 13 is determined to be a directive to the recording agent "R" 304 to retrieve and replay the macro called "Germanize" and apply it with the input text parameter "Good night". The recording agent "R" 304 retrieves that macro from the store of dialog macros, and replays it to the conversational agent "C" 306 without requiring any user involvement. Line 13 in the third column of Table 1 (under recording agent "R") corresponds to the macro as identified by the recording agent "R" 304. Lines 13 and 14 in fourth column of Table 1 (under conversational agent "C") correspond to the expansion of the macro as seen by the conversational agent "C" 306.

FIG. 4 shows an example conversational agent interaction in one embodiment with the macro system in one embodiment. For explanation, the dialog is partitioned into 5 blocks.

Dialog Block 1 (normal agent interaction):
H: identify the text "La vie est belle"
C: You chose: identify GET text La vie est belle. Calling now. "fr"

The dialog in block 1 represents a normal agent interaction with a conversational agent, asking it to identify what language "La vie est belle" is in. The agent determines that the language is French and returns the appropriate language code. This example block does not record or replay macros.

Dialog Block 2 (macro recording):
H: translate the text "La vie est belle" from source "fr" to target "en"
C: You chose: translate GET text "La vie est belle" source "fr" target "en". Calling now.
"Life is Beautiful"
H: name this action
C: What would you like to name this action?
H: myAction
C: Thanks, action myAction created This part of the conversation starts off by asking the agent to translate the phrase "La vie est belle" from French to English. The user then asks the macro system to record the preceding interaction (the request for a translation) as a macro (here called an action). The agent prompts for a name to use for the macro. The user supplies the requested name, and the agent confirms that the macro has been created. Note that in this example, the user did not need to request that a macro be recorded in advance, but was able to create one from past actions. The system automatically records the macro as starting with the translate request, and does not include the preceding identify language request as part of the recorded macro.

Dialog Block 3 (macro replay):
H: myAction
C: You chose: translate GET text "La vie est belle" source "fr" target "en". Calling now. "Life is Beautiful"

In the dialog of block 3, the user invokes the name of a previously recorded macro (called an action here) to request that the system replay that macro. The system obliges, and the text "La vie est belle" is again translated from French to English.

Dialog Block 4 (macro replay with parameterization)
H: myAction with something else for text such as "Le chat dort"
C: You chose: translate GET text "Le chat dort" source "fr" target "en". Calling now. "The cat sleeps"

In the dialog of block 4, the user again invokes the name of a macro to request that the system replay that macro. However, in this case, the user also requests that some of the parameters of the previous macro be overriden with new values. In particular, the text that should be translated is specified as "Le chat dort". The source and target language remain unchanged. The system obliges, and translates the text "Le chat dort" from French to English.

Dialog Block 5 (synonym creation)
H: I would like to add a synonym for an action.
C: On which action or resource would you like to add a synonym?
H: On the action translate.

C: You chose: translate. What synonym would you like to add?
H: convert
C: Ok, adding convert as a synonym for translate The interaction in the dialog of block 5 shows another type of macro allowed by the system of the present disclosure in one embodiment, synonym creation. A synonym is a macro that acts like an existing action, but with a new name. In this case, the "convert" macro is created, which behaves identically to the existing translate action. After this command, a subsequent interaction such as "convert the text "La vie est belle" from source "fr" to target "en" "would return "Life is Beautiful", as in Block 2.

A method that allows for in-dialog personalization of conversational agents, in one aspect, may include running an existing conversational agent, letting the user record his/her interactions with that agent as macros, and letting the user replay those macros. The method in one embodiment provides the ability to record a part of an interaction with an agent and save it as a macro. This macro can later be replayed, possibly with some changes, to save the user from having to re-enter the saved parts of the interaction manually. This ability can be integrated into or added on top of an existing conversational agent.

Figure 5:
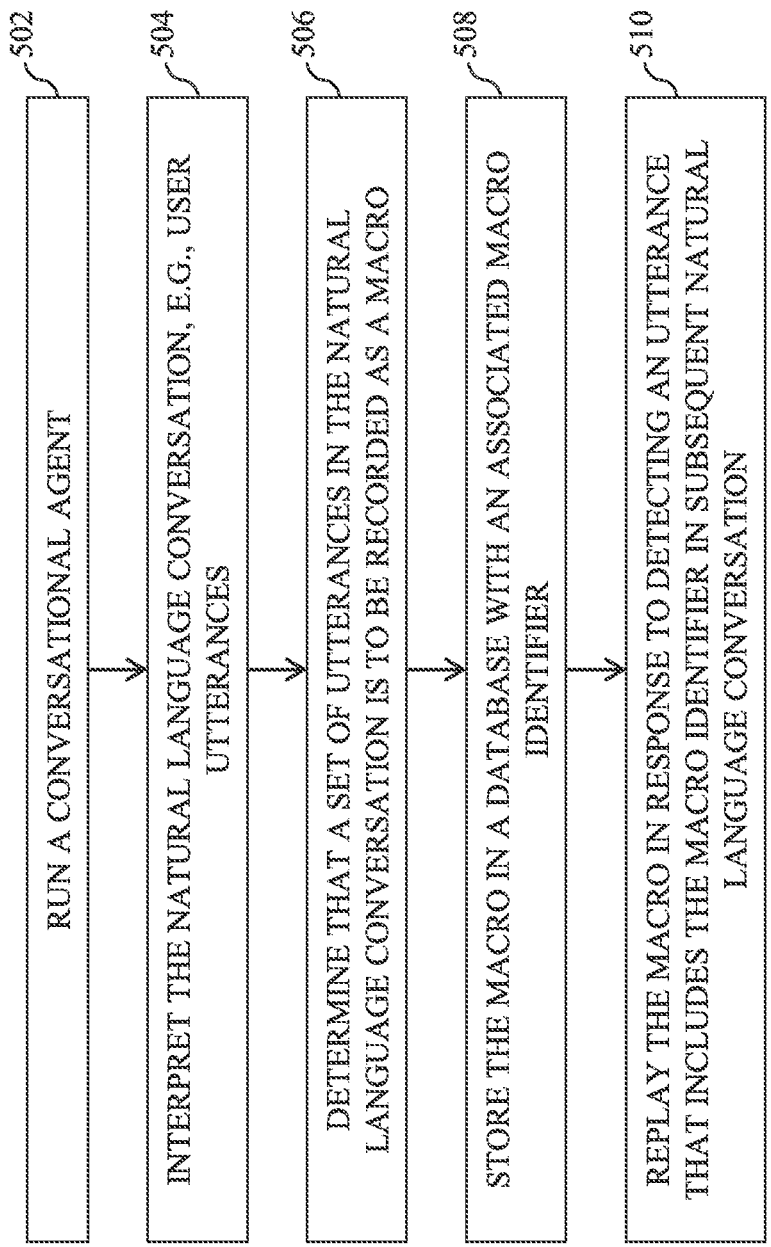
FIG. 5 is a flow diagram illustrating a computer-implemented conversational agent method in one embodiment.

FIG. 5 is a flow diagram illustrating a computer-implemented conversational agent method in one embodiment. The method may be executed by at least one hardware processor. At 502, a hardware processor runs a conversational agent, to engage in a natural language conversation with a user, wherein a conversation takes place between the user and a machine, for instance, the hardware processor executing the conversational agent. At 504, the conversational agent interprets the natural language conversation by the conversational agent by parsing and tokenizing utterances in the natural language conversation. For instance, the conversational agent receives user utterances and interprets them to carry out a conversation with the user and to provide a service to the user according to a request in the conversation. At 506, based on the interpreting, the conversational agent determines that a set of utterances in the natural language conversation is to be recorded as a macro. At 508, the conversational agent stores the macro in a database with an associated macro identifier. Replaying of the macro executes a function specified in the set of utterances. The conversational agent may prompt the user to input the macro identifier. In another aspect, the conversational agent may automatically create or suggest a name or identifier for the macro.

At 510, the method may also include replaying the macro in response to detecting an utterance that includes the macro identifier in subsequent natural language conversation. The subsequent natural language conversation may include the same conversation session or another future conversation session.

In another aspect, the method may include the ability to parameterize previously recorded macros. For instance, after a macro is recorded, it can be parameterized: parts of the interaction can be treated as parameters that can be replaced, either to create a new version of the macro, or during replay, to alter the replay. Consider the following example excerpt:
C: Should the macro that we just recorded be parameterized?
H: Yes, please parameterize it on the input text "Good morning".
C: Okay, your recorded macro has a parameter which is the input text.
The parameter is recognized as the part of the previous recording that matched "Good morning", and the user gives the parameter a name "input text". The recording agent can then annotate the recorded macro with the additional information about the parameter before storing it in the macro store. Later, when the macro is invoked, the recording agent retrieves a possibly different actual parameter value from the invocation and substitutes it for the previously recorded value "Good morning" in the macro.

Yet in another aspect, the method may include the ability to specialize previously recorded macros. For example, a previously recorded macro can be altered. For instance, the previously recorded macro may be altered to mark part of the interaction as parameterized, to add and/or specify parameters, and/or to amend or fix-up a macro. For example, additional dialog interactions between the user and the recording agent may take place, where the recording agent prompts the user for the specialization, the user enters it in natural language, and the recording agent performs the specialization of the macro.

Still in another aspect, the method may include the ability to identify the boundaries of a macro after the facts. For instance, even if the user did not explicitly start recording a macro, the method allows the user, at a later point in time, to indicate that the user would like to create a macro encompassing previous actions. Different ways to retroactively delineate the beginning of the macro can be used, for example, including identifying logical blocks in the conversation, or a user interface (e.g., conversational or with other input mechanism) that prompts the user to select and/or indicate the appropriate parts of the conversation for recording.

In another aspect, the method may include the ability to replay a macro from within a macro. For instance, while a macro is being recorded, a different macro can be replayed. For example, the recording agent detects that an utterance in the macro being recorded refers to another macro, retrieves the other macro from the store, replays it, and afterwards continues recording as before. That replay is then encoded as part of the recorded macro. When the recoded macro is later replayed, the other macro will again be invoked as needed.

In another aspect, the method may include the ability to export a macro as a script for inspection or editing by a developer. For instance, macros may be imported and/or exported, enabling advanced users and/or developers to view and modify macros using external tools. Macros may be externalized using, for example, a scripting and/or programming language, a visual tool, or via another means.

In another aspect, the method may include the ability to replay a macro step by step. For example, macros may record a sequence of interactions with the agent. It can be helpful to enable a macro to be replayed one step at a time, with a type of prompt in between steps (or a timed delay). This simplifies and improves debugging, and can allow a user to run a part of a macro (e.g., cancelling execution in between steps).

In another aspect, the method may include the ability to generate a new agent which integrates a given set of macros. For example, if a set of macros is deemed useful, it may be used to enhance an agent, creating a new version that supports the given macros. These macros may then be considered a fully integrated part of the new agent instead of a separate concept on top of it.

In another aspect, the method may include the ability to share recorded macros with other users. For instance, if a macro is thought to be more generally useful, a user may share it with others, for example, either via conversational (in-dialogue) commands or via external commands (e.g., a webpage). Other users may then make use of these macros, possibly after importing or referencing them.

Figure 6:
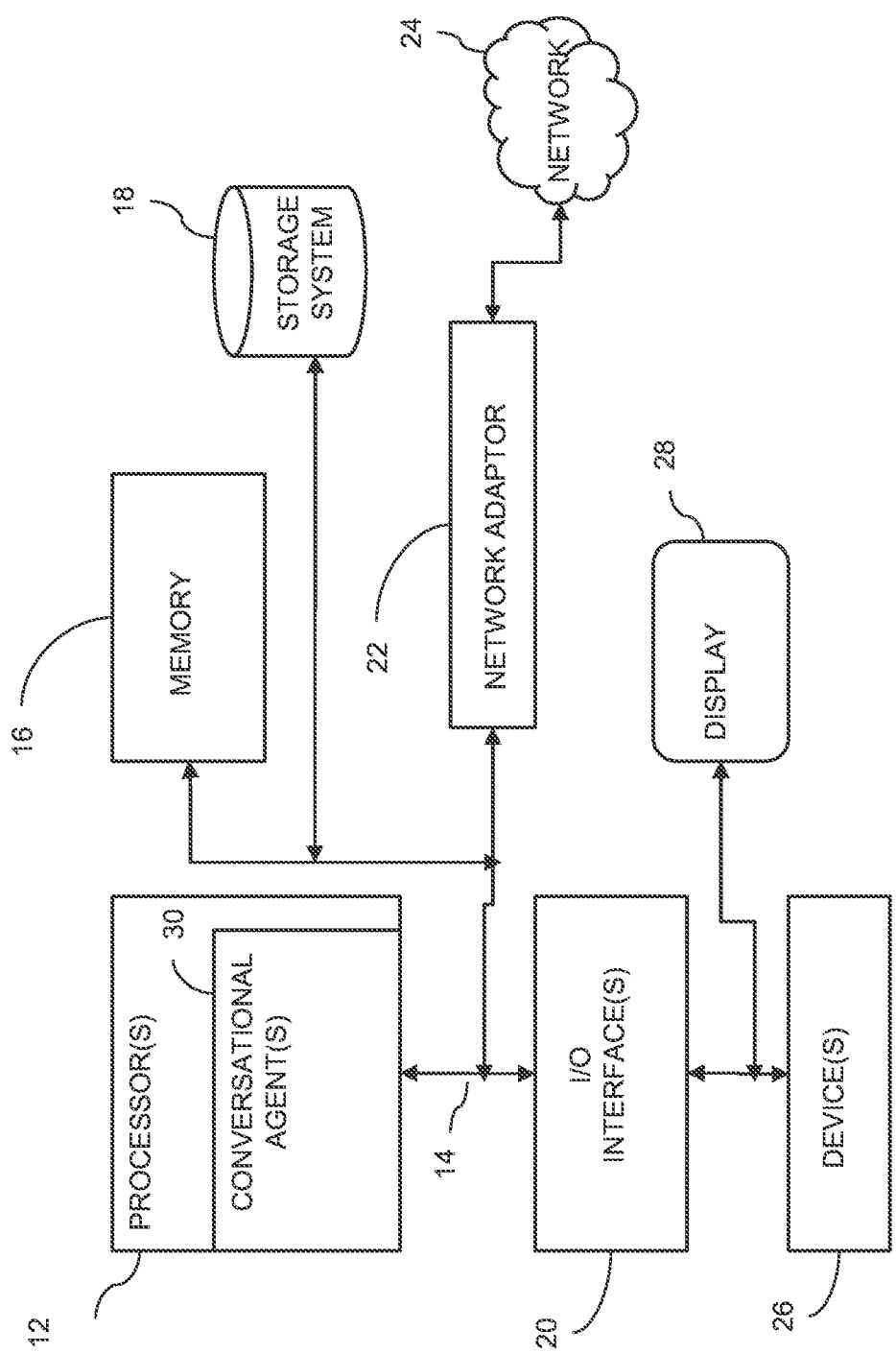
FIG. 6 illustrates a schematic of an example computer or processing system that may implement a conversational agent system in one embodiment.

FIG. 6 illustrates a schematic of an example computer or processing system that may implement a conversational agent system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 30, which may perform the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented conversational agent method executed by at least one hardware processor, comprising:
    interpreting a natural language conversation by a conversational agent by parsing and tokenizing utterances in the natural language conversation;
    based on the interpreting, determining that a set of utterances in the natural language conversation is to be recorded as a macro, wherein an option to record the macro with at least one parameter is provided to enable the macro to be replayed with variation; and
    storing the macro in a database with an associated macro identifier,
    wherein the macro can be replayed based on detecting an utterance that includes the macro identifier in a subsequent natural language conversation.

2. The method of claim 1, further comprising:
    prompting by the computer conversational agent for the macro identifier.

3. The method of claim 1, further comprising:
replaying the macro in response to detecting an utterance that includes the macro identifier in a subsequent natural language conversation, wherein the replaying of the macro executes a function specified in the set of utterances.

4. The method of claim 1, further comprising parameterizing the macro, wherein the macro identifier is uttered with a parameter and in response executed with the parameter.

5. The method of claim 1, further comprising specializing the macro.

6. The method of claim 1, wherein determining that a set of utterances in the natural language conversation is to be recorded as a macro based on the interpreting is performed subsequent to the conversation taking place, by identifying a boundary of the macro in the conversation.

7. The method of claim 1, further comprising replaying a new macro within the macro.

8. The method of claim 1, further comprising generating a new conversational agent comprising a set of macros stored in the database.

9. The method of claim 1, further comprising exporting the macro as a script for inspection and editing.

10. The method of claim 1, further comprising sharing the macro with another user.

11. The method of claim 1, further comprising replaying the macro step by step, allowing for debugging of the macro.

12. A computer program product comprising a computer readable storage medium having program of instructions embodied therewith, the program instructions executable by a device to cause the device to:
interpret a natural language conversation by parsing and tokenizing utterances in a natural language conversation;
based on interpreting the natural language conversation, determine that a set of utterances in the natural language conversation is to be recorded as a macro, wherein an option to record the macro with at least one parameter is provided to enable the macro to be replayed with variation; and
store the macro in a database with an associated macro identifier,
wherein the macro can be replayed based on detecting an utterance that includes the macro identifier in a subsequent natural language conversation.

13. The computer program product of claim 12, wherein the device is further caused to
prompt for the macro identifier.

14. The computer program product of claim 12, wherein the device is further caused to
replay the macro in response to detecting an utterance that includes the macro identifier in a subsequent natural language conversation.

15. The computer program product of claim 12, wherein the device is further caused to parameterize the macro, wherein the macro identifier is uttered with at least one parameter and in response executed with the at least one parameter.

16. The computer program product of claim 12, wherein the device is further caused to specialize the macro.

17. The computer program product of claim 12, wherein the device determining that a set of utterances in the natural language conversation is to be recorded as a macro based on interpreting the natural language conversation is performed subsequent to the conversation taking place, by identifying a boundary of the macro in the conversation.

18. The computer program product of claim 12, wherein the device is further caused to
replay a new macro within the macro.

19. The computer program product of claim 12, wherein the device is further caused to
generate a new conversational agent including at least a set of macros stored in the database.

20. The computer program product of claim 12, wherein the device is further caused to export the macro as a script for inspection and editing.

* * * * *